United States Patent [19]

Berry et al.

[11] 3,873,679

[45] Mar. 25, 1975

[54] REHEAT METHOD FOR USE IN SULFUR RECOVERY PROCESS

[75] Inventors: Kay L. Berry; John W. Palm, both of Tulsa, Okla.

[73] Assignee: Amoco Production Company, Tulsa, Okla.

[22] Filed: May 29, 1973

[21] Appl. No.: 365,384

[52] U.S. Cl.................................. 423/574, 423/576
[51] Int. Cl............................................. C01b 17/04
[58] Field of Search ....... 423/573, 574, 576; 23/262

[56] References Cited
UNITED STATES PATENTS

| | | | |
|---|---|---|---|
| 2,413,714 | 1/1947 | Keeling............................. | 423/576 |
| 2,650,154 | 8/1953 | Anderson........................... | 423/574 |
| 3,399,970 | 9/1968 | Grekel et al....................... | 423/573 |

FOREIGN PATENTS OR APPLICATIONS

| | | |
|---|---|---|
| 1,138,437 | 1/1969 | United Kingdom |

*Primary Examiner*—G. O. Peters
*Attorney, Agent, or Firm*—Arthur McIlroy; Paul F. Hawley

[57] ABSTRACT

The problem of bypass reheating in split flow plants with less than about 20 mol percent hydrogen sulfide in the feed is overcome by diverting at least a portion of the bypass gas stream and mixing it with the furnace effluent. The resulting mixture, after passing through a heat exchanger, is adjusted to the proper first reactor inlet temperature.

The present invention relates to the recovery of free sulfur from sour natural gas, refinery gas, and similar mixtures containing hydrogen sulfide. More particularly, it is concerned with a method for recovering elemental sulfur from gaseous hydrogen sulfide-containing mixtures having a hydrogen sulfide content of not more than about 20 mol percent.

8 Claims, 3 Drawing Figures

REHEAT METHOD FOR USE IN SULFUR RECOVERY PROCESS

BACKGROUND OF THE INVENTION

This particular improvement is directed to the so-called "split flow" process employed in cases where the percentage of combustibles in the hydrogen sulfide-containing gas is less than about 50 mol percent. In this process, as much of the acid gas as possible without adversely affecting combustion stability is fed to a furnace with sufficient air to convert one-third of the total hydrogen sulfide fed to the plant and all the hydrocarbons that might be fed to the furnace to sulfur dioxide, carbon dioxide, and water. Because the feed to the furnace is oxidized more completely with the resulting higher flame temperature, combustion can be sustained with gas containing less hydrogen sulfide than required by methods in which all the gas is fed to the furnace. However, with hydrogen sulfide concentrations in the range of 10 to 15 percent or lower, it is difficult to maintain stable combustion conditions even in the split flow process. Accordingly, with feeds of such low hydrogen sulfide content, stabilization of combustion is usually obtained by either preheating the air or acid gas streams, or by the use of sulfur recycle as described, for example, in U.S. Pat. No. 3,399,970. However, with feed gas containing less than about 12 mol percent hydrogen sulfide, the conventional reheat gas system for preheating first reactor feed (which uses a stream of hot gas obtained as waste heat boiler effluent) is inadequate when employing sulfur recycle in accordance with known techniques.

Thus, with these lean $H_2S$ feeds containing a low concentration of combustibles, the portion of the stream fed directly to the first reactor, i.e., the bypassed portion, must be increased and the fraction going to the furnace has to be decreased in order to obtain a stable flame temperature. Using a typical reheat gas temperature of 1,000° to 1,200°F, conditions occur where there is insufficient reheat gas, when mixed with the bypassed stream, to preheat the resulting mixture to the temperature required for the first reactor. This situation cannot be remedied by use of reheat gas temperatures in excess of 1,000° to 1,200°F because of lack of suitable materials of construction for the valving needed.

BRIEF DESCRIPTION OF THE INVENTION AND DRAWINGS

We have now discovered that the foregoing disadvantages when using sulfur recycle with lean $H_2S$ containing streams can be overcome by diverting at least a portion of the bypassed stream and introducing it upstream of the waste heat boiler. By controlling the flow of the bypass stream to the waste heat boiler and the first reactor, we are able to produce a first reactor feed gas in the desired temperature range and to eliminate completely the need for a reheat gas stream.

For example, with a reheat gas of 1,000°F and a feed gas containing 10 mol percent $H_2S$ or less and using sulfur recycle, it is impossible to obtain a reaction mixture (prepared by blending the waste heat boiler effluent with the bypass stream) having the desired first reactor feed temperature of 425° to 430°F. The table below shows the mixture temperature attainable with feeds of various compositions when 1,000°F waste heat boiler effluent is mixed with the bypassed stream. Also, mixture temperatures are shown produced from feeds of corresponding composition when preheating in accordance with the present invention.

TABLE I

| $H_2S$ in Feed mol Percent | Mixture Temperature with 1000°F Gas | Mixture Temperature Attainable by Present Invention |
|---|---|---|
| 5 | 250 | 435 |
| 10 | 380 | 720 |
| 15 | 510 | 980 |

While it is seen that a mixture temperature as high as 510°F can be obtained with ordinary bypass reheating, and a feed gas having an $H_2S$ content of 15 mol percent, it must be remembered that this result is obtained at design conditions. If the feed gas flow rate is decreased appreciably as often happens in sulfur plants, especially those operating in refineries, the desired first reactor feed temperature of 430°F could not be reached. On the other hand, it will be noted that by using the preheating method of our invention achievement of the proper reaction mixture temperature is assured over a wider range of operating conditions.

Our invention will be further illustrated by reference to the accompanying drawings in which.

Figure 1:
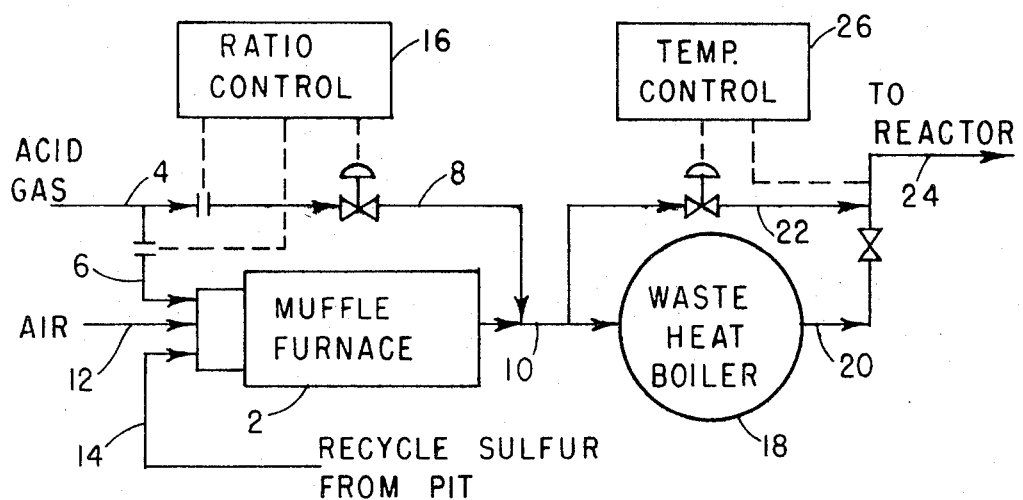
FIG. 1 is a flow diagram showing arrangement of bypass lines for systems in which the feed thereto contains less than about 15 mol percent $H_2S$.
Figure 2:
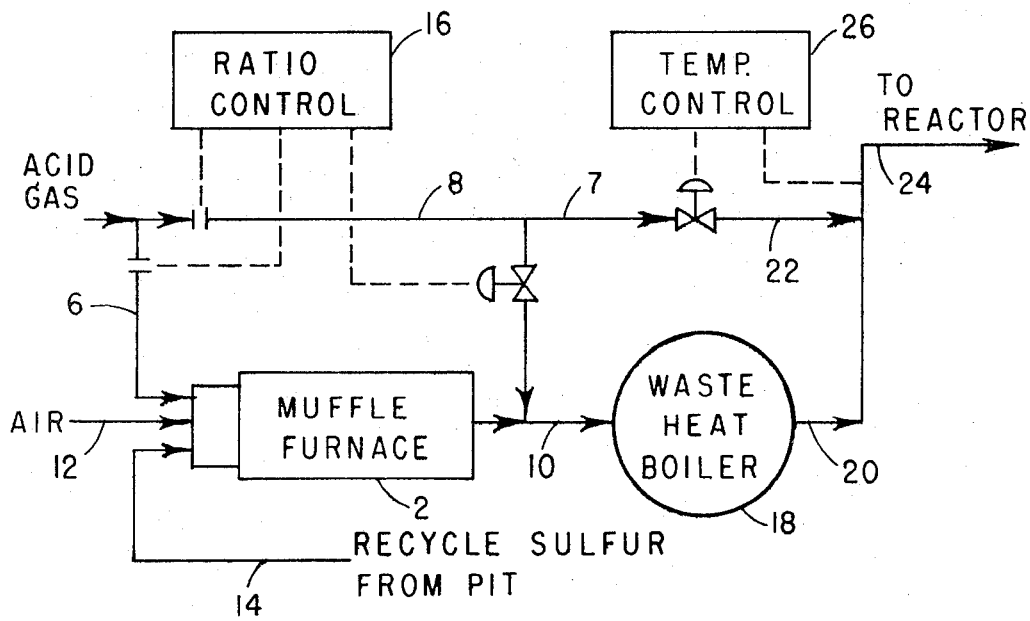
FIG. 2 is a flow diagram showing arrangement of bypass lines for the system in which the $H_2S$ content of the feed ranges from about 15 to about 20 mol percent.

In FIGS. 1 and 2 the same numbers refer to similar lines and equipment therein.

Referring now to FIG. 1, a portion of the acid gas in line 4 and containing less than about 15 mol percent $H_2S$ enters muffle furnace 2 via line 6. The balance of the feed stream in line 4 bypasses the furnace through line 8 and is mixed with hot (2,000° to 2,200°F) furnace effluent in line 10. Air and sulfur are introduced into the furnace through lines 12 and 14, respectively. The volume of gas flowing through lines 6 and 8 is regulated by ratio controller 16 with the amount of gas flowing through line 8 varying inversely with $H_2S$ content in the feed. Likewise, the amount of sulfur recycle to the furnace through line 14 varies inversely with the $H_2S$ content of the feed. Effluent from furnace 2 is mixed with cold bypass gas in line 8 to produce a mixture in line 10 having a temperature of about 980°F or less. With a feed gas having an $H_2S$ content of 6 mol percent, this temperature is 500°F. At the higher temperature more of the mixture in line 10 is passed through waste heat boiler 18. The waste heat boiler effluent in line 20 is now at about 300° to 375°F and is subsequently brought up to the desired first reactor inlet temperature of about 425°F by mixing with the hot gas in line 22 after which the resulting mixture passes into line 24 going to the first reactor. The amount of gas flowing through lines 20 and 22 is, of course, determined by temperature controller 26.

In FIG. 2 the system is similar to that illustrated in FIG. 1 except a portion of the bypassed gas in line 8 is diverted through lines 7 and 22 where it is mixed with waste heat boiler effluent at 500° to 600°F in line 20 to produce a first reactor feed gas having a temperature of 425°F. Because of the higher $H_2S$ content (15 to 20 mol percent) in the feed than is employed in the design shown in FIG. 1, not as much cold gas in line 8 needs to be introduced into line 10 as was required in the case shown in FIG. 1.

Figure 3:
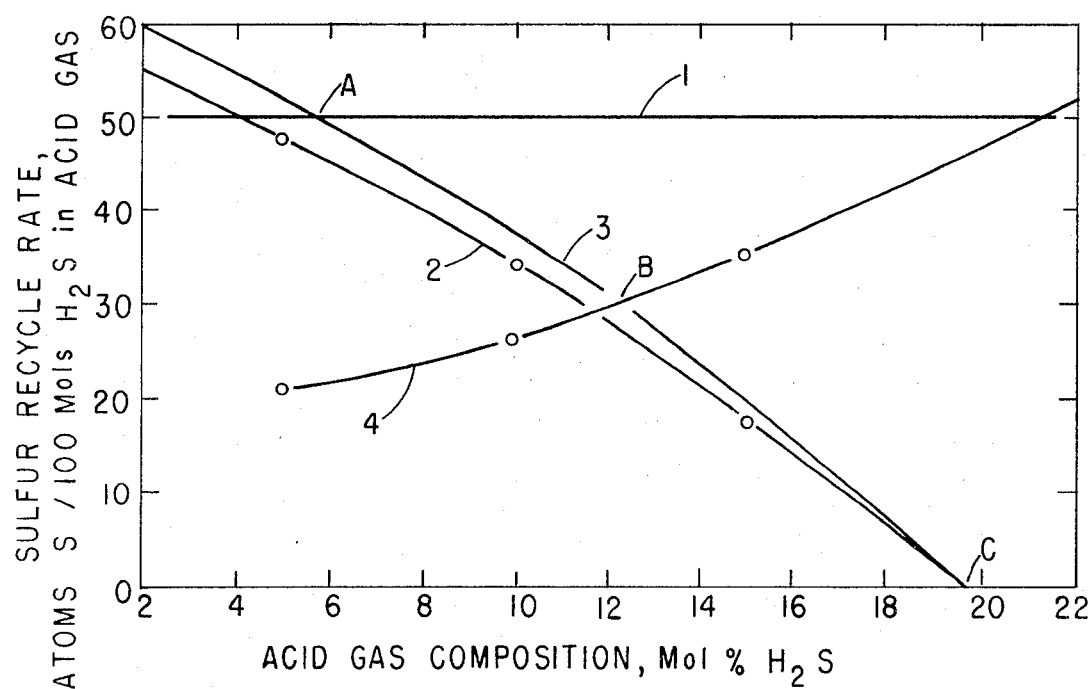
FIG. 3 is a series of plots showing the relationship of $H_2S$ content of the feed gas to sulfur recycle rate determined by various restraints.

In FIG. 3, Curve No. 1 represents the maximum useful sulfur recycle rate by stoichiometry. Curve No. 2 shows the minimum sulfur recycle rate to reach 2,000°F furnace temperature (adiabatic flame). Curve No. 3 represents a 10 percent higher recycle rate than Curve No. 2 and is recommended moreover for operation. Curve No. 4 depicts the maximum sulfur recycle rate resulting in a No. 1 reactor inlet temperature of 425°F in the conventional process using all of the waste heat boiler pass 1 effluent at 1,000°F as the sole reheating source.

Comparison of Curves 3 and 4 clearly depicts (as already pointed out by the temperatures in Table I) that operation by the conventional process is not feasible in the region of about 5–12 mol percent $H_2S$ in the acid gas, where Curve No. 3 is higher than Curve No. 4. Use of the present invention is feasible along line AB of Curve No. 3 if the acid gas contains about 5–12 mol percent $H_2S$. Since the reheat gas temperature in the conventional process will vary with plant throughput, this temperature will often be less than 1,000°F, which would cause Curve No. 4 to be lower than shown. This reduces the operable range of the conventional process and increases the range over which use of this invention is required.

Thus the process of our invention is required unequivocally if the acid gas has an $H_2S$ content in the range of 5–12 mol percent $H_2S$. For a design of flexible plant throughput, the process of our invention should also be used in the range of about 12–20 mol percent $H_2S$ in the feed. Operation in this range is depicted by line BC of Curve No. 3 in FIG. 3.

The process of this invention differs, for example, from that disclosed in U.S. Pat. No. 2,650,154 in that the latter may introduce at least a portion of the bypassed stream into the furnace downstream of the combustion zone. If this procedure is followed, however, with a lean acid gas, i.e., containing not more than about 20 mol percent $H_2S$, the resulting mixture is not hot enough for the noncatalytic reaction to occur and thus lighten the load on the first catalytic reactor. Therefore, we prefer to inject all or part of the bypass stream at a point in the system located between the furnace and the downstream heat exchanger, i.e., the waste heat boiler. By following this procedure it is possible to control the first reactor feed gas temperature (of lean gas feeds) within the required range.

We claim:

1. In a process for the recovery of free sulfur from a gaseous mixture containing $H_2S$ by means of the split flow process wherein only a minor amount of said mixture is diverted into a combustion zone and the $H_2S$ in the diverted portion is converted to sulfur dioxide, the $H_2S$ content of said gaseous mixture not exceeding about 20 mol percent and wherein a portion of the sulfur dioxide required in said process is supplied by burning free sulfur in said combustion zone, thereafter cooling the resulting combustion products by discharging them into an indirect heat exchange zone, mixing the effluent from the latter with the portion of said gaseous mixture bypassing said combustion zone to give a reaction mixture of $H_2S$ and $SO_2$ in a molar ratio of approximately 2:1, respectively, and thereafter reacting said $H_2S$ and $SO_2$ in the presence of a catalyst for the reaction in a known manner to produce free sulfur, the improvement comprising mixing at least a portion of the undiverted $H_2S$-containing mixture with the hot effluent from said combustion zone upstream from said heat exchange zone, the amount of said gaseous mixture bypassing said combustion zone and mixed with said effluent varying inversely with the $H_2S$ content of said gaseous mixture, employing the resulting mixture to prepare a reaction mixture (1) of $H_2S$ and $SO_2$ in an approximate molar ratio of about 2:1 having a temperature of from about 425° to 500°F, said temperature being achieved by direct heat exchange with one of the following streams: (1) a portion of said resulting mixture, (2) the remainder of said undiverted $H_2S$-containing mixture, and thereafter subjecting the $H_2S$ and $SO_2$ in said resulting mixture to reaction under known conditions to produce free sulfur.

2. The process of claim 1 wherein all of said gaseous mixture bypassing said combustion zone is mixed with said effluent to form said resulting mixture having a temperature ranging from about 435° to about 980°F, cooling a portion of said resulting mixture in said heat exchange zone, and mixing cooled effluent from the latter with the remainder of said resulting mixture to produce reaction mixture (1).

3. The process of claim 1 wherein a portion of said gaseous mixture bypassing said combustion zone is mixed with said effluent, cooling said resulting mixture to a temperature of from about 500° to 600°F by means of indirect heat exchange and thereafter blending said last mentioned mixture with the remainder of said gaseous mixture to produce reaction mixture (1).

4. The process of claim 2 wherein the cooled effluent from said heat exchange zone is at a temperature of from about 300° to about 375°F.

5. The process of claim 2 wherein the $H_2S$ content of said gaseous mixture is not more than about 12 mol percent.

6. The process of claim 1 wherein a portion of said gaseous mixture bypassing said combustion zone is mixed with said effluent to form said resulting mixture having a temperature ranging from about 435° to about 980°F, cooling said resulting mixture in said heat exchange zone, and thereafter blending said last mentioned mixture with the remainder of said gaseous mixture to produce reaction mixture (1).

7. The process of claim 2 wherein the $H_2S$ content of said gaseous mixture ranges from about 5 to about 12 mol percent.

8. The process of claim 6 wherein the $H_2S$ content of said gaseous mixture is between about 12 and about 20 mol percent.

* * * * *